United States Patent [19]

Beverage

[11] Patent Number: 5,699,966
[45] Date of Patent: Dec. 23, 1997

[54] EXHAUST NOZZLE OF A GAS TURBINE ENGINE

[75] Inventor: Allan D. Beverage, Cincinnati, Ohio

[73] Assignee: General Electric Company, Cincinnati, Ohio

[21] Appl. No.: 136,014

[22] Filed: Mar. 31, 1980

[51] Int. Cl.$^6$ ................................................ F02K 1/42
[52] U.S. Cl. .................. 239/265.19; 239/265.27; 60/230
[58] Field of Search .................. 239/265.27, 265.19, 239/265.31, 265.33; 60/229, 230

[56] References Cited

U.S. PATENT DOCUMENTS

| | | | |
|---|---|---|---|
| 3,474,966 | 10/1969 | Holmes | 239/265.27 |
| 3,570,247 | 3/1971 | Denning | 60/230 |
| 3,598,318 | 8/1971 | Schiel | 239/265.13 |
| 3,774,868 | 11/1973 | Goetz | 239/265.19 |
| 4,037,405 | 7/1977 | Huenniger | 60/229 |
| 4,074,859 | 2/1978 | Lowman | 239/265.33 |
| 4,241,876 | 12/1980 | Pedersen | 239/265.27 |

OTHER PUBLICATIONS

Report No. NASA CR-135289/General Electric Company dated Jun. 1978/pp. 7a and 7b.

Report No. NASA CR-135252/Stevens dated Feb. 1978/pp. 8, 21, 75, 139.

Primary Examiner—Michael J. Carone
Attorney, Agent, or Firm—Andrew C. Hess; Wayne O. Traynham

[57] ABSTRACT

An exhaust nozzle of a gas turbine engine effective for reducing the emission of infrared radiation and providing an extensive maneuvering capability. The nozzle preferably is of the two-dimensional type and includes an exhaust cowl with a generally rectangular cross-sectional exhaust opening and a plug within the downstream end of the cowl. The plug, which is preferably wedge-shaped, is pivotable about a transverse axis running through the aft portion of the plug by an appropriate means, for example, a cam or a screw jack mechanism. The nozzle can also include blocker doors and louvers for providing thrust reversal.

16 Claims, 2 Drawing Sheets

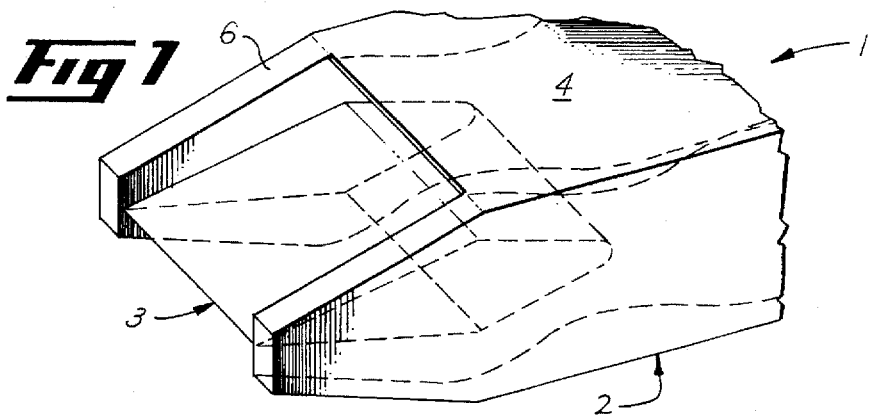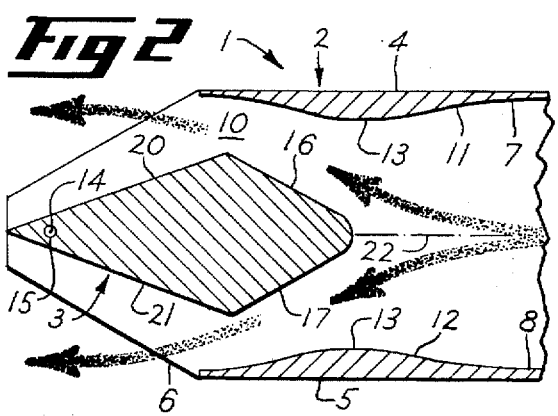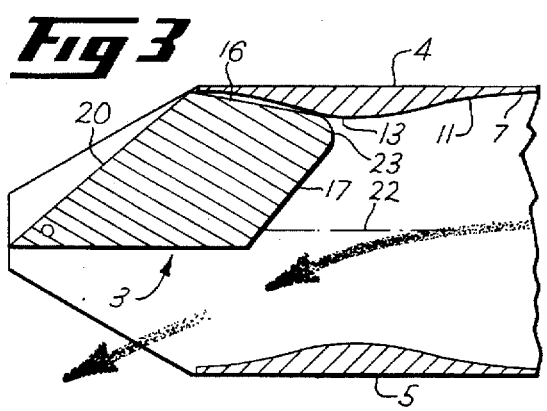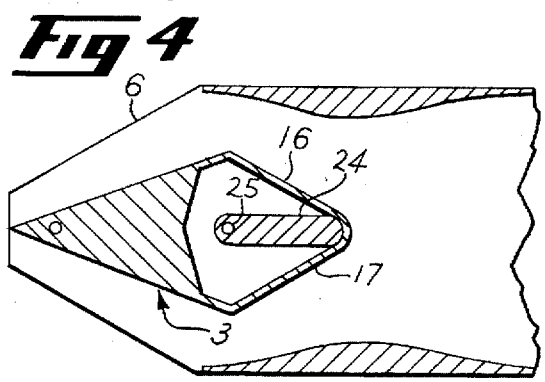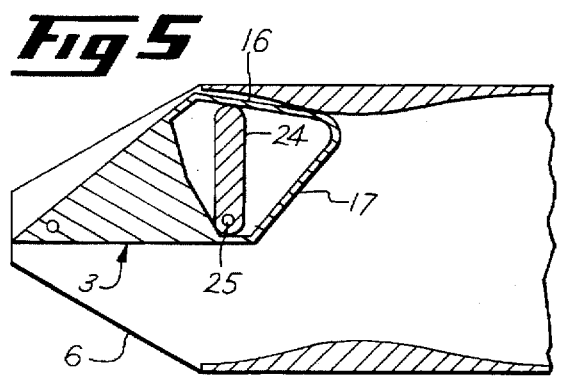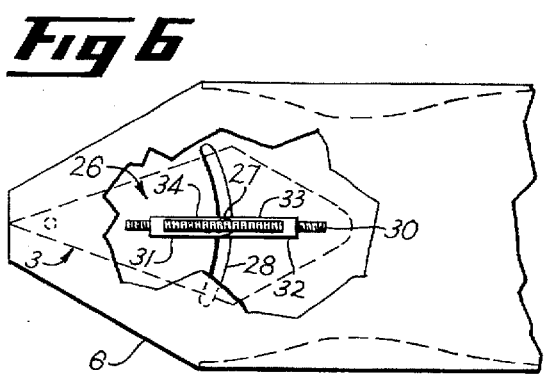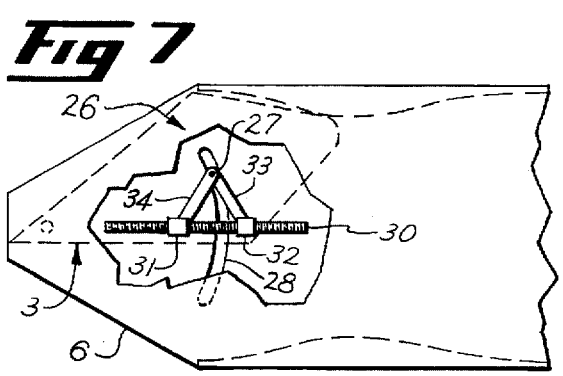

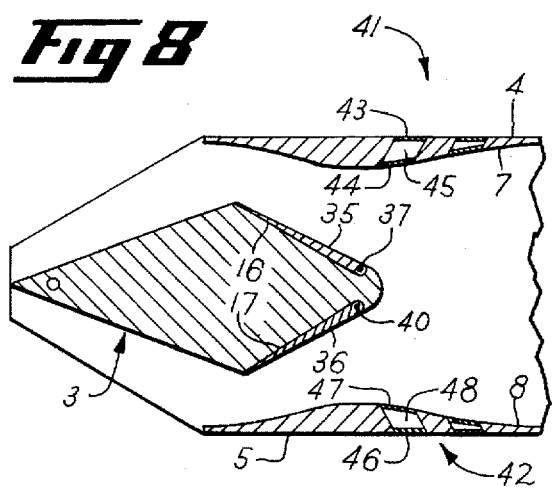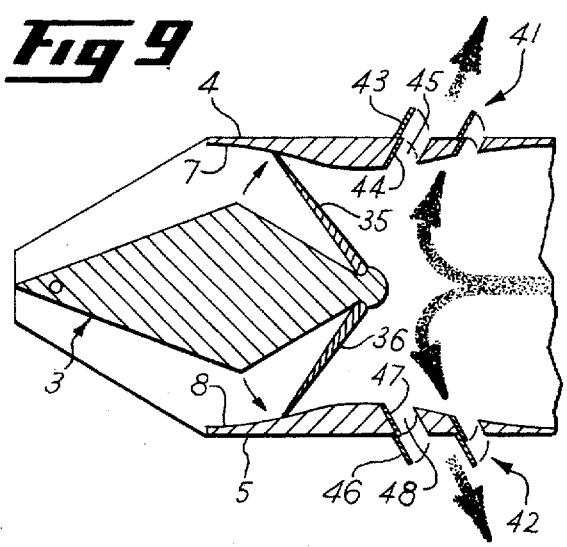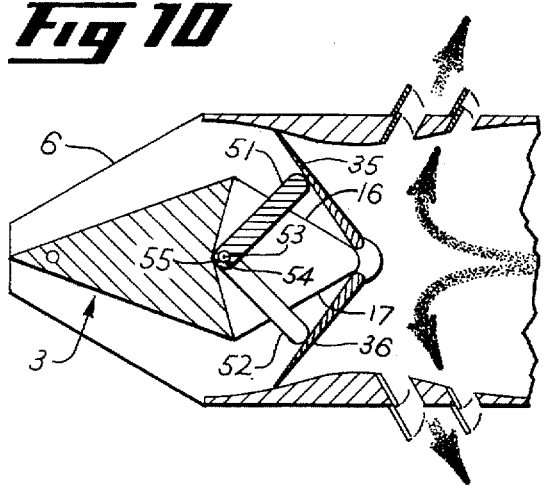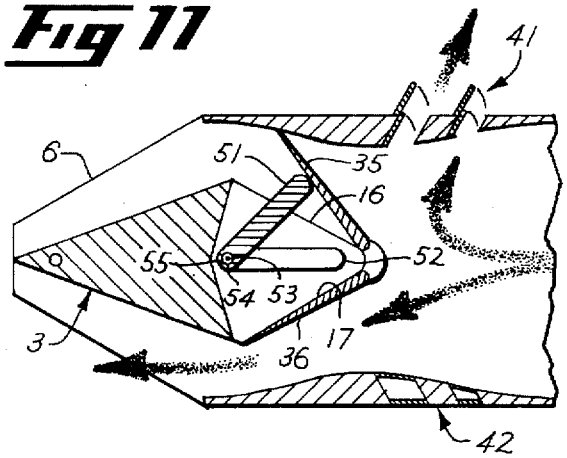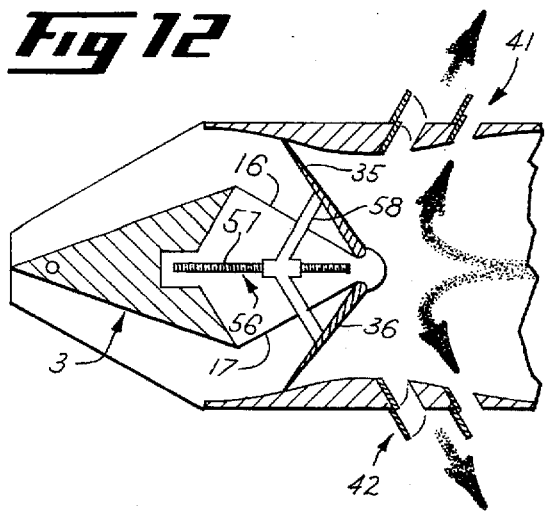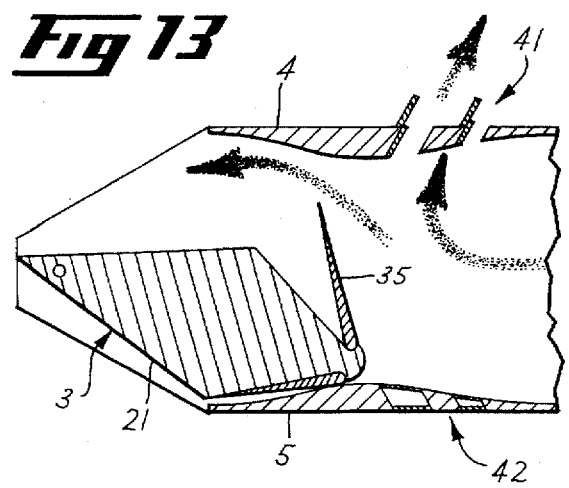

EXHAUST NOZZLE OF A GAS TURBINE ENGINE

BACKGROUND OF THE INVENTION

1. Field of the Invention

This invention relates to exhaust nozzles of gas turbine engines, and particularly to a new and improved aircraft two-dimensional exhaust nozzle comprising means effective for reducing infrared radiation emission while also providing an extensive maneuvering capability.

2. Description of the Prior Art

The hot exhaust gases flowing through the exhaust nozzle of a gas turbine engine cause the components of the nozzle exposed to the gases to become hot. When hot, the nozzle components emit infrared radiation. Additionally, the exhaust gases emit infrared radiation.

It is desirable to reduce such infrared emissions, particularly in military aircraft applications where adversary airborne or surface forces may use infrared detectors to locate and destroy targets. An airborne target is therefore less vulnerable if its infrared emissions are reduced, especially the emissions that may extend in the direction of an infrared detector. For example, in an air-to-air combat situation, it would be beneficial to a potential target to reduce the infrared emissions from the upper half of its exhaust nozzle. This would reduce the chance of a successful attack by an infrared-seeking missile launched by an attacking aircraft from above or in a tight pursuit turn. If, on the other hand, an attack on an aircraft were expected by a surface launched infrared-seeking missile, it would be beneficial to reduce the infrared emissions from the lower half of the exhaust nozzle.

The infrared emission problem becomes particularly acute when wedge-shaped plugs are used in two-dimensional exhaust nozzles. Such plugs generally include relatively large, flat hot surfaces whose infrared emissions are readily detected by infrared sensors. The prevalent methods to reduce infrared emissions from the hot plug surfaces are to cool the surfaces with engine fan air or to cool the surfaces with external air piped to the plug. However, these methods have the undesirable effects of reducing engine performance or increasing aircraft drag. Furthermore, even when such methods cool the surfaces of the plug, they have no effect on the exhaust gas stream exiting the nozzle and its resultant infrared emissions.

It is also desirable that aircraft have an in-flight maneuvering capability. This is particularly true of high performance military aircraft. An effective means for in-flight maneuvering is thrust vectoring, that is, altering the direction of the engine exhaust and thereby correspondingly changing the direction of the aircraft thrust vector. Pivotable wedge-shaped plugs within two-dimensional exhaust nozzles are capable of diverting the direction of the exhaust gas stream and thereby satisfactorily providing thrust vectoring. However, most such nozzles pivot the plug in such a manner that no reduction in infrared emissions from the plug surfaces occurs. The aircraft, even during maneuvering, is therefore vulnerable to detection by infrared detectors.

Another desirable feature which can be incorporated in exhaust nozzles is thrust reversal. Thrust reversal, which involves diverting a part or all of the stream of engine exhaust gases to a generally forward direction, is useful not only to slow the aircraft during landing roll, but also can be used to slow and maneuver the aircraft in flight. Current wedge-shaped plugs within two-dimensional exhaust nozzles provide thrust reversal by extending flaps or doors from the surfaces of a non-pivotable plug. However, no current nozzles are known to have utilized the broad range of maneuvering possibilities available from mounting the thrust reversal means on a pivotable plug.

In view of the above-mentioned infrared emission problem, a primary object of the present invention is therefore to reduce the emission level of infrared radiation from the surface of a plug within an exhaust nozzle, and particularly a two-dimensional exhaust nozzle, without substantially affecting engine performance or increasing aircraft drag.

Another object of the present invention is to provide an extensive in-flight maneuvering capability to an aircraft through the use of a pivotable plug within the exhaust nozzle while also allowing for a reduction in infrared emissions from the plug during such maneuvering.

Yet another object of the present invention is to provide a thrust reversal capability to an aircraft effective for slowing an aircraft and, by combining the thrust reversal means with a pivotable plug, for maneuvering the aircraft in flight.

SUMMARY OF THE INVENTION

The present invention, in accordance with one embodiment thereof, comprises an exhaust nozzle of a gas turbine engine including an exhaust cowl and a plug within the downstream end of the cowl. The plug extends the horizontal width of the cowl and is pivotable about a transverse axis passing through the aft portion of the plug. The pivoting of the plug permits maneuvering and also reduces the emission of infrared radiation from those plug surfaces which are no longer exposed to the hot exhaust gases. The nozzle includes means for pivoting the plug, such as a cam or a screw jack mechanism.

In a preferred form, the exhaust nozzle is of the two-dimensional type, having walls which define a generally rectangular exhaust opening. In a particular embodiment, blocker doors are included on the plug and the cowl includes louvers. When the blocker doors and louvers are opened, the exhaust gas is diverted through the louvers causing thrust reversal. The blocker doors are opened and closed by means, such as cams or a screw jack mechanism. The plug, each blocker door, and the louvers are preferably operable independently of one another, thereby allowing an extensive maneuvering capability.

BRIEF DESCRIPTION OF THE DRAWING

This invention will be better understood from the following description taken in conjunction with the accompanying drawing, wherein:

FIG. 1 is a fragmentary rear perspective view of an exhaust nozzle incorporating features of the present invention.

FIG. 2 is a longitudinal cross-sectional view of a two-dimensional exhaust nozzle including a wedge-shaped plug according to the present invention.

FIG. 3 is a view of the exhaust nozzle of FIG. 2 showing the plug in the "up" position.

FIG. 4 is a view of the exhaust nozzle showing a cam used for pivoting the plug.

FIG. 5 is a view of the exhaust nozzle showing the plug pivoted to the "up" position by the cam.

FIG. 6 is a view of the exhaust nozzle showing a screw jack mechanism for pivoting the plug.

FIG. 7 is a view of the exhaust nozzle of FIG. 6 showing the plug pivoted to the "up" position by the screw jack mechanism.

FIG. 8 is a view of an exhaust nozzle including a plug, blocker doors, and louvers.

FIG. 9 is a view of the exhaust nozzle of FIG. 8 showing both blocker doors and all louvers opened.

FIG. 10 is a view of an exhaust nozzle showing both blocker doors opened by cams.

FIG. 11 is a view of the exhaust nozzle of FIG. 10 showing one blocker door opened by a cam.

FIG. 12 is a view of an exhaust nozzle wherein both blocker doors are opened by a screw jack mechanism.

FIG. 13 is a view of the exhaust nozzle showing the plug pivoted to the "down" position and the upper blocker door and upper louvers opened.

DESCRIPTION OF THE PREFERRED EMBODIMENT

Turning now to a consideration of the drawing, and in particular to FIGS. 1 and 2, there is shown a two-dimensional exhaust nozzle of a gas turbine engine. The exhaust nozzle 1 is located at the downstream end of a gas turbine engine (not shown). The function of the exhaust nozzle is to discharge the exhaust gases from the engine in the direction indicated by the arrows and to the atmosphere at the highest possible velocity to produce the greatest momentum change and thrust. A preferred form of this invention deals with two-dimensional exhaust nozzles, that is, those exhaust nozzles having a generally rectangular exhaust opening.

Referring to FIG. 2, the nozzle 1 comprises an exhaust cowl 2 and a plug 3. The exhaust cowl 2 has inner walls which define a generally rectangular cross-sectional shape and is preferably defined by an upper wall 4, a lower wall 5, and opposed spaced side fairings one of which is indicated at 6. The inner face 7 of the upper wall 4 and the inner face 8 of the lower wall 5 define the upper and lower boundaries of the passageway of the nozzle through which the exhaust gases pass, while the inner faces 10 of the side fairings 6 form the lateral boundaries.

The particular shape of the inner faces 7 and 8 are determined by the type of aircraft and engine on which the nozzle is mounted and by the flight characteristics, particularly the speed regime, for which the aircraft is designed. FIG. 2 shows the inner faces 7 and 8 as constituting converging/diverging upper and lower ramps 11 and 12, respectively. By converging/diverging it is meant that the upper and lower ramps 11 and 12 converge, or become closer together approaching the apexes 13 of the ramps, and diverge or become more separated downstream of the apexes 13. Such a converging/diverging nozzle is particularly adaptable for high velocity aircraft. However, this invention is equally adaptable to any other type of two-dimensional exhaust nozzle as well, such as one in which the inner faces of the upper and lower walls constitute converging ramps. A portion of each side fairing 6 preferably extends downstream of the aft edges of the upper and lower walls 4 and 5, for reasons to be explained hereinafter. The particular outer shapes of the upper and lower walls 4 and 5 and the side fairings 6 are determined by the aircraft external fuselage or wing aerodynamic surfaces, and the shapes shown in FIG. 2 are therefore only representative.

The plug 3 is located within the nozzle 1, and preferably a portion of the plug protrudes downstream of the aft edges of the upper and lower wars 4 and 5. The plug 3 is mounted for pivotable movement between the inner faces 7 and 8 of the upper and lower wars about a transverse axis 14 passing through the aft portion of the plug. A pivot member 15, such as a rod, extends along the transverse axis 14. The ends of the pivot member 15 are supported or carried by and preferably extend into, the side fairings 6, and thus by the plug 3 as well as the pivot member 15, is supported by the side fairings.

FIGS. 1 and 2 show a preferable arrangement of the plug 3 and the side fairings 6, wherein a portion of each extends downstream of the aft edges of the upper and lower walls 4 and 5 and the pivot member 15 extends into that downstream portion of each side fairing. However, other arrangements can also be satisfactorily utilized, for example, where the aft edges of the plug 3, the side fairings 6, and the upper and lower walls 4 and 5 are adjacent.

The plug 3 can be of any shape which is compatible with the nozzle in which it is used. One such suitable shape when used with a convergent/divergent nozzle is the wedge-shape shown in FIG. 2. Preferably, the wedge-shaped plug 3 has four transverse surfaces: an upper compression surface 16, a lower compression surface 17, an upper expansion surface 20, and a lower expansion surface 21. By transverse surfaces it is meant that the surfaces 16, 17, 20, and 21, and thus the plug 3, extend between the opposed side fairings 6, with the side edges of each surface being adjacent the side fairings. Although the plug 3 is shown in several cross-sectional views of the drawing as having a solid internal structure, this is for illustration only. It is to be understood that the plug 3 can also be hollow or can have any other internal arrangement.

FIG. 2 shows the plug 3 in its center position. That is, the spaces between the plug 3 and the upper and lower inner faces 7 and 8 are substantially equal. When the plug 3 is in this position, engine thrust is directed along the engine longitudinal axis, depicted by the dashed line 22.

Referring now to FIG. 3, the plug 3 is shown pivoted from the center position to the up position. In the up position, the upper compression surface 16 of the plug 3 is adjacent and abuts or substantially abuts the inner face 7 of the upper wall 4. Substantially all the exhaust gases flowing through the nozzle are thereby diverted to the lower portion of the nozzle. Preferably, the forward tip 23 of the plug 3 is substantially adjacent the apex 13 of the upper ramp 11 such that a relatively smooth, continuous surface, comprising the upstream portion of the upper ramp 11 and the lower compression surface 17 of the plug 3, is presented as a diverted flow path to the exhaust gases.

As a result of the plug 3 being in the up position, the exhaust gases exit the nozzle in a direction downward from the longitudinal axis 22 of the engine. Therefore, the engine thrust vector, that is, the direction of net engine thrust, being opposite to the direction of exhaust gas travel, is in a direction upward from the longitudinal axis 22. Thus, thrust vectoring and the resultant aircraft maneuvering capability has been achieved by pivoting the plug 3.

Another result of the plug 3 being in the up position is that the upper compression surface 16 and the upper expansion surface 20 of the plug 3 are not appreciably heated by the exhaust gases. Such surfaces, therefore, emit less infrared radiation than they do when exhaust gases pass across them. Furthermore, inasmuch as the exhaust gas stream itself is directed downwardly, less infrared radiation is emitted from it in an upward direction than when the plug is in the center or down position.

The plug 3 can, of course, be pivoted to the down position with corresponding but opposite effects on the engine thrust and emitted infrared radiation. Also, the plug 3 can be pivoted to any intermediate position between the up and down positions with intermediate effects on the thrust and infrared radiation emissions.

The pivotable plug of this invention can be incorporated on an aircraft in a predetermined relationship with other aircraft control means. For example, when the pivotable plug is incorporated on an aircraft which includes forward mounted canard control surfaces, upward and downward displacements of the aircraft without aircraft rotation can be achieved by coordinated pivot movements of the plug 3 and the canard control surfaces.

Any suitable means can be used to pivot the plug 3 between the up and down positions. One example of such suitable means is shown in FIGS. 4 and 5, wherein a cam 24 is located within the plug 3. A cam shaft 25 extends horizontally through an off-center axis of the cam, with at least one end and preferably both ends of the cam shaft protruding into the interior of the side fairings 6. Other means, such as an electrical or hydraulic motor (not shown), located at or within the side fairing 6 can rotate the cam shaft 25 which in turn would pivot the cam 24 within the plug 3. The inner faces of the upper compression surface 16 and the lower compression surface 17 act as camming surfaces for the plug. When the cam 24 is pivoted in an upward direction, for example, it slidingly contacts the inner face of the upper compression surface 18, causing the plug 3 to pivot in an upward direction, as seen in FIG. 5. Conversely, when the cam 24 is pivoted in a downward direction, it slidingly contacts the inner face of the lower compression surface 17 causing the plug 3 to pivot in a downward direction.

Preferably, the cam 24 has a generally rectangular shape with curved ends, with the cam shaft 25 extending through an end portion thereof. Further, the cam 24 can comprise a single cam member extending transversely a portion of the width or substantially the entire width of the plug 3, or it can comprise a series of cams spaced apart along the width of the plug 3 on a common cam shaft 25.

Another example of suitable means for pivoting the plug 3 between the up and down positions is shown in FIGS. 6 and 7 as a screw jack mechanism 26. Preferably, a screw jack mechanism 28 is located within each of the side fairings 6, with each mechanism being connected by a shaft 27 running through and connected to the plug 3. Each side fairing 6 includes a slot, indicated by the lines 28, through which the shaft 27 extends. Each screw jack mechanism 26 preferably includes a threaded rod 30 and first and second internally threaded members 31 and 32. A first arm 33 and a second arm 34 are each pivotally connected at one end to the plug side of an internally threaded member 31 or 32 and at the other end to the shaft 27. Other means, such as an electric or hydraulic motor (not shown), are used to rotate the threaded rod 30. When the plug 3 is in the center position, as shown in FIG. 6, and the threaded rod 30 is rotated, the direction of threads on the internally threaded members 31 and 32 are such that the members 31 and 32 move toward each other, causing the first and second arms 33 and 34 to move the shaft 27 in either an upward direction, as shown in FIG. 7, or in a downward direction, as desired. Selection of the upward or downward direction of movement can be made by a small initial offset of the first and second arms 33 and 34 in the direction desired by means (not shown), such as, for example a hydraulic piston or electrical solenoid. Inasmuch as the plug 3 is connected to the shaft 27, it is pivoted up or down with the shaft. The end of the shaft 27 and the first and second arms 33 and 34 are offset to the plug side of the threaded rod 30 within the side fairing 6. The threaded rod 30 remains stationary but rotatable within the side fairing 6, and thus no interference results between the end of the shaft 27 and the threaded rod 30 when the plug 3 is pivoted.

FIG. 8 shows another embodiment of the two-dimensional nozzle. Blocker doors 35 and 36 when in the closed position abut the upper and lower compression surfaces 16 and 17 of the plug 3, and in such a closed position actually act as compression surfaces for the plug 3. The blocker doors 35 and 36 are individually pivotable outwardly from the plug 3 about pivot axes 37 and 40 to an open position such that when the plug 3 is in the center position, the tips of the blocker doors engage the inner faces 7 and 8 of the upper and lower walls 4 and 5, as shown in FIG. 9. The blocker doors can also be pivoted to intermediate positions between the open and closed positions. Each blocker door 35 and 36 can comprise either a single door or a series of adjacent doors spaced transversely across the surfaces of the plug.

When the plug 3 includes blocker doors 35 and 36, the cowl 2 includes at least one louver 41 in the upper wall 4 and at least one louver 42 in the lower wall 5. Although FIGS. 8 and 9 show two louvers in each upper and lower wall 4 and 5, the number can be varied as desired. Each louver 41 comprises an outer door 43, an inner door 44, and a passageway 45. Each louver 42 comprises an outer door 46, an inner door 47, and a passageway 48. When the louvers 41 and 42 are closed, as shown in FIG. 8, each outer door 43 and 46 is flush with the outer face of the upper wall 4 and the lower wall 5, respectively, and each inner door 44 and 47 is flush with the inner face 7 of the upper wall 4 and the inner face 8 of the lower wall 5, respectively. When the louvers 41 and 42 are opened, as shown in FIG. 9, the outer doors 43 and 46 pivot outwardly from the outer surfaces of the upper and lower walls 4 and 5, while the inner doors 44 and 47 pivot into the passageways 45 and 48. With the louvers 41 and 42 open, communication is provided between the interior of the exhaust nozzle 1 and its exterior through the passageways 45 and 48.

The angles to which the outer and inner doors 43, 44, 46, and 47 open as well as the dimensions of the passageways 45 and 48 can be constructed as desired, and those shown in FIGS. 8 and 9 are only representative. The doors can also be so constructed as to be openable to varying selected angles or positions. Any suitable means (not shown), such as an electric or hydraulic motor, can be used to open and close the doors of the louvers 41 and 42.

The blocker doors 35 and 36 can likewise be opened or closed by any suitable means. Such means are preferably operable independently of the means for pivoting the plug 3 and the means for opening and closing the louvers 41 and 42.

One example of suitable means for opening and closing the blocker doors 35 and 36 is shown in FIGS. 10 and 11. FIG. 10 shows both blocker doors opened while FIG. 11 shows only one blocker door open. A cam 51 is used to open the blocker door 35 and a cam 52 is used to open the blocker door 36. The cams are independently operable such that one blocker door can be opened while the other remains closed, as is shown in FIG. 11. The cams pivot about a common pivot axis 53 through which extend coaxial cam shafts 54 and 55 which operate the cams 51 and 52, respectively. Other means, such as electric or hydraulic motors (not shown), which are preferably located within the plug 3 itself, but which alternatively can be located on or within the side fairings 6, rotate the cam shafts 54 and 55 which in turn pivot the cams 51 and 52. The inner faces of the blocker doors 35 and 36 act as camming surfaces for the blocker doors. When the cams 51 and 52 are pivoted, they slidingly contact the inner faces of the blocker doors causing the blocker doors to open or close. The blocker doors can also be pivoted to intermediate positions between the open and close positions. The cams 51 and 52 are preferably generally rectangular with curved ends and are of such dimension that they are completely contained with the area between the blocker doors when the blocker doors are closed. Each cam 51 and 52 can extend the entire width of the plug 3. However, if the plug 3 is itself to be pivoted by a cam 24, as is shown in FIGS. 4 and 5, a preferable arrangement is to alternate the cams 24, 51, and 52 along the width of the plug 3. In that arrangement of cams, the upper and lower compression surfaces 16 and 17 of the plug 3 are continuous adjacent the cam 24, but have openings adjacent the cams 51 and 52 through which the cams can protrude when pivoted. Also, each cam 51 and 52 can comprise a single cam or a series of cams on a common cam shaft.

Another example of suitable means for opening and closing the blocker doors 35 and 36 is shown in FIG. 12. In this arrangement, a screw jack mechanism 56 comprising a threaded rod 57 extending longitudinally and an internally threaded flanged member 58 are contained within the plug 3. Other means, such as an electric or hydraulic motor (not shown), rotate the threaded rod 57 causing the internally threaded flanged member 58, the ends of which protrude through openings in the upper and lower compression surfaces 16 and 17 of the plug 3, to move forward or aft. The outer end of the internally threaded flanged member 58 slidingly contact the inner faces of the blocker doors 35 and 36 causing them to open or close. A single screw jack mechanism 56 or a plurality thereof spaced along the width of the plug 3 can be used to open and close the blocker doors 35 and 36.

Thrust vectoring, and thus an extensive aircraft maneuvering capability, can be achieved by use of the plug 3, the blocker doors 35, 36, and the louvers 41 and 42. For example, with the arrangement shown in FIG. 9, that is, the plug 3 in the center position and the blocker doors 35 and 36 and the louvers 41 and 42 open, thrust reversal of the aircraft occurs. This aids the aircraft in stopping during its landing roll, or if the aircraft is in flight, a sudden decrease in its velocity will occur.

FIG. 13 shows another example of an arrangement of the elements of this invention to permit maneuvering of the aircraft. The plug 3 is in the down position, the louvers 42 in the lower wall 5 are closed, the louvers 41 in the upper wall 4 are open, and the upper blocker door 35 is pivoted to its open position. In this arrangement, most of the exhaust gases are directed through the louvers 41 in a generally upward direction, causing a resultant downward thrust. Another result of this particular arrangement is that the lower expansion surface 21 of the plug 3 is not heated by the exhaust gases and therefore emits a reduced amount of infrared radiation, particularly to an infrared detector below the aircraft. Additionally, inasmuch as the exhaust gases are directed in a generally upward direction, a reduced amount of infrared radiation is emitted by them in a downward direction. Of course, since the plug, the blocker doors, and the louvers are preferably operated independently of each other, numerous other combinations of thrust vectoring and reduced infrared radiation emissions are possible.

It is to be understood that this invention is not limited to the particular embodiments disclosed and it is intended to cover all modifications coming within the true spirit and scope of this invention as claimed.

What is claimed is:

1. An exhaust nozzle for a gas turbine engine comprising:
   a) an exhaust cowl having a generally rectangular exhaust opening defined by upper and lower walls and opposed spaced side fairings;
   b) a plug including a forward end portion and an aft end portion, said plug being spaced between said upper and lower walls of said cowl and extending transversely across the width thereof for dividing said exhaust opening into an upper exhaust opening and a lower exhaust opening, said plug being pivotable about a transverse axis passing through said aft end portion thereof and between an upper position wherein said forward end portion thereof is adjacent said upper wall for substantially closing said upper exhaust opening and increasing said lower exhaust opening and a lower position wherein said forward end portion is adjacent said lower wall for substantially closing said lower exhaust opening and increasing said upper exhaust opening; and
   c) means effective for pivoting said plug.

2. The exhaust nozzle of claim 1, wherein inner surfaces of said upper and lower walls define converging/diverging ramps.

3. The exhaust nozzle of claim 1, wherein said side fairings extend downstream of aft edges of said upper and lower walls.

4. The exhaust nozzle of claim 1, wherein said plug has a wedge-shaped cross-sectional configuration.

5. The exhaust nozzle of claim 1 wherein the shapes of said plug and said upper and said lower walls are such that when said plug is in said upper or said lower position, said plug and said upper or said lower wall are thereby aligned for presenting a substantially smooth, continuous diverted flow path for exhaust gases.

6. The exhaust nozzle of claim 1, wherein said means for pivoting said plug comprises a cam within said plug and connected to a rotatable cam shaft, at least one end of said cam shaft being carried by one of said side fairings and the inner faces of said plug acting as camming surfaces for said plug.

7. The exhaust nozzle of claim 1, wherein said means for pivoting said plug comprises a screw jack mechanism within one of said side fairings, said screw jack mechanism including a rotatable threaded rod, at least one internally threaded member on said threaded rod, and at least one arm pivotally connected to said internally threaded member and to a shaft extending through and connected to said plug.

8. The exhaust nozzle of claim 7, wherein said exhaust nozzle includes a second said screw jack mechanism within the other of said side fairings and connected to said shaft.

9. The exhaust nozzle of claim 1 wherein
   said side fairings extend downstream of aft edges of said upper and lower walls; and
   said aft end portion of said plug protrudes downstream of said aft edges of said upper and lower walls.

10. The exhaust nozzle of claim 1, wherein each upper and lower wall further comprises at least one louver for opening and thereby providing communication between the interior and the exterior of the exhaust nozzle, and said plug further comprises pivotable blocker doors and means for pivoting said blocker doors.

11. The exhaust nozzle of claim 10, wherein each blocker door abuts a transverse surface of said plug when said blocker door is in a closed position.

12. The exhaust nozzle of claim 11, wherein said means for pivoting said blocker doors comprises a cam within said plug and connected to a rotatable cam shaft for each said blocker door, the inner faces of said blocker doors acting as camming surfaces for said blocker doors.

13. The exhaust nozzle of claim 11, wherein said means for pivoting said blocker doors comprises a screw jack mechanism within said plug, said screw jack mechanism including a rotatable threaded rod and an internally threaded flanged member on said threaded rod and in sliding contact with said blocker doors.

14. An exhaust nozzle for a gas turbine engine comprising:

a) an exhaust cowl having a generally rectangular exhaust opening defined by upper and lower walls and opposed spaced side fairings, each upper and lower wall having at least one louver for opening and thereby providing communication between the interior and the exterior of the exhaust nozzle, said side fairings extending downstream of aft edges of said upper and lower wall;

b) a plug including a forward end portion and an aft end portion, having a wedge-shaped cross-sectional configuration, extending between said side fairings and dividing said exhaust opening into an upper and a lower exhaust opening, said aft end portion of said plug protruding downstream of said aft edges of said upper and lower walls, said plug being pivotable between said upper and lower walls about a transverse axis passing through said aft end portion thereof for increasing one while decreasing the other of said upper and lower exhaust openings, said plug further including pivotable blocker doors and means for pivoting said blocker doors, each blocker door abutting a transverse surface of said plug when said blocker door is closed; and c) means effective for pivoting said plug.

15. The exhaust nozzle of claim 14, wherein said means for pivoting said plug comprises a cam within said plug and connected to a rotatable cam shaft, at least one end of said cam shaft being carried by one of said side fairings, the inner faces of said transverse surfaces acting as camming surfaces for said plug.

16. The exhaust nozzle of claim 14, wherein said means for pivoting said plug comprises two screw jack mechanisms, each within one of said side fairings, each said screw jack mechanism including a rotatable threaded rod, at least one internally threaded member on said threaded rod, and at least one arm pivotally connected to said internally threaded member and to a shaft extending through and connected to said plug, and both said screw jack mechanisms being connected to said shaft.

* * * * *